United States Patent
Kim et al.

(10) Patent No.: US 11,178,549 B1
(45) Date of Patent: Nov. 16, 2021

(54) INFORMATION PROVIDING METHOD FOR PROVIDING INFORMATION REGARDING TERMINAL ACTIVATION AND ELECTRONIC DEVICE PERFORMING THE SAME

(71) Applicant: Coupang Corp., Seoul (KR)

(72) Inventors: Cho Rong Kim, Seoul (KR); Jung Hun Lee, Seoul (KR); Min Jung Lee, Seoul (KR); Han Sol Kim, Seoul (KR); Young Jin Kim, Seoul (KR); Chang Hyun Park, Seoul (KR); Sang Won Seo, Seoul (KR); Hye Jin Kim, Seoul (KR); So Yeon Son, Seoul (KR); Mi Seon Lim, Seoul (KR); Yoo Jin Yang, Seoul (KR); Yoo Jeong Jo, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/149,525

(22) Filed: Jan. 14, 2021

(30) Foreign Application Priority Data

Oct. 21, 2020 (KR) ........................ 10-2020-0137072

(51) Int. Cl.
*H04W 12/72* (2021.01)
*H04W 8/26* (2009.01)
(Continued)

(52) U.S. Cl.
CPC ........ *H04W 12/72* (2021.01); *G06Q 10/0832* (2013.01); *G06Q 10/0833* (2013.01); *H04W 8/245* (2013.01); *H04W 8/265* (2013.01)

(58) Field of Classification Search
CPC ..... H04W 12/72; H04W 8/245; H04W 8/265; H04W 12/06; H04W 12/062;
(Continued)

(56) References Cited

U.S. PATENT DOCUMENTS

2020/0219051 A1* 7/2020 Karpenko ........... H04L 12/2832

FOREIGN PATENT DOCUMENTS

| JP | 2009-80636 A | 4/2009 |
| KR | 10-2012-0081760 A | 7/2012 |

(Continued)

OTHER PUBLICATIONS

Shirali-Shahreza, M. Hassan, and Mohammad Shirali-Shahreza. "Sending mobile software activation code by SMS using steganography." Third International Conference on Intelligent Information Hiding and Multimedia Signal Processing (IIH-MSP 2007). vol. 1. IEEE, 2007. (Year: 2007).*

(Continued)

*Primary Examiner* — Sharad Rampuria
(74) *Attorney, Agent, or Firm* — Knobbe, Martens, Olson & Bear, LLP

(57) ABSTRACT

A method performed by an electronic apparatus to provide information associated with activation of a portable terminal according to various embodiments includes acquiring order information associated with the portable terminal, acquiring information associated with delivery of the portable terminal corresponding to the order information from a server, and, based on the order information and the information associated with the delivery of the portable terminal, providing the information associated with the activation of the portable terminal, and the information associated with the activation comprises information on whether the portable terminal has been shipped out.

14 Claims, 12 Drawing Sheets

(51) Int. Cl.
*G06Q 10/08* (2012.01)
*H04W 8/24* (2009.01)

(58) Field of Classification Search
CPC ............. H04W 12/065; H04W 12/068; H04W 12/069; H04W 12/08; H04W 12/082; H04W 12/084; H04W 12/086; H04W 12/088; H04W 12/12; H04W 12/121; H04W 12/122; G06Q 10/0832; G06Q 10/0833; H04L 63/08
See application file for complete search history.

(56) References Cited

FOREIGN PATENT DOCUMENTS

| | | |
|---|---|---|
| KR | 10-1491023 B1 | 2/2015 |
| KR | 10-1542670 B1 | 7/2015 |
| KR | 10-2015-0096571 A | 8/2015 |
| KR | 10-1605826 B1 | 3/2016 |
| KR | 10-2016-0054160 A | 5/2016 |
| KR | 10-2017-0033197 A | 3/2017 |
| KR | 10-1845925 B1 | 3/2018 |

OTHER PUBLICATIONS

International Search Report received in PCT/KR2020/014610 dated Jul. 20, 2021.

\* cited by examiner

FIG. 5A

Order without scheduled activation appointment
-- Information on 13 orders

514 — Play ▾

| See | | | ID | Subject | 512 | Requester | Request date |
|---|---|---|---|---|---|---|---|
| Order without scheduled activation appointment | 13 | ☐ | N #11932 | [Activation appointment] 2020/09/22 / 19000080979240 / Kimoo | | Kim oo | 5 mins ago |
| Order without scheduled for activation | 31 | ☐ | P #11714 | No answer][Activation appointment] 2020-09-20 / 10000081413658/ Ryuoo | | Ryuoo | Sun 22:30 |
| Order with activation complete | 2.1k | ☐ | P #11680 | [No answer][Activation appointment] 2020/09/20 / 32000081524055/Ohoo | | Ohoo | Sun 09:57 |
| Order not scheduled to re-activate | 1 | ☐ | P #11680 | [No answer][Activation appointment] 2020/09/20 / 32000081523936/Ohoo | | Ohoo | Sun 09:55 |
| Order subject to CS follow-up | 6 | ☐ | P #11679 | [No answer][Activation appointment] 2020/09/20 / 32000081523102/Ohoo | | Ohoo | Sun 09:38 |
| Inbound order | 6.4k | ☐ | P #11679 | [No answer][Activation appointment] 2020/09/20 / 32000081523056/Ohoo | | Ohoo | Sun 09:37 |
| My unsolved order | 0 | ☐ | O #11610 | [Incomplete][Resubscription/Change of device (using existing USIM)][Activation appointment] 2020-09-19 19000080706366/Choioo | | Choioo | Sat 02:36 |
| My solved order | 787 | ☐ | P #11117 | No answer][Activation appointment] 2020/09/15 / 20000080505039/ ZHUCHEN | | ZHUCHEN | Sep 15 |
| Information on temporarily stopped order | 242 | ☐ | P #10980 | No answer][Activation appointment] 2020-09-14 / 18000081433739/ LI | | LI | Sep 14 |
| | | ☐ | P #10978 | No answer][Incomplete][Number transfer][Activation appointment]2020-09-14 / 31000081062337/ Limoo | | Limoo | Sep 14 |

FIG. 5B

| Date of order |
| Sep 23, 2020 |
| Product name |
| XX Electronics, SM-F700M |
| Product ID(Product ID) |
| 1637979485 |
| Option ID(Vendoritem ID) |
| 70783122583 |
| Model name |
| XX터치, SM-F700N |
| Subscription type |
| Subscription type, Change of device, Change of device only |
| ☐ Whether or not to buy USIM |
| Discount type |
| Device discount, 24 months, Device discount (Public subsidy) + Additional subsidy |
| Rates |
| 100GB, Unlimited home/mobile phone calls(+video/additional 300 min) |

522

[Resubscription/Change of device (using existing USIM)][Activation appointment]
2020-09-23 / 200000816673511 / Today 14:02*

Open reply  Internal memo

Chatting ˅ | T U M Q        All (11)  Open (1)  Internal (10)

524

Inquiry for customer info — 526

FIG. 5D

| Status of distribution |
|---|
| |

| Order information | | | | | | |
|---|---|---|---|---|---|---|
| Order No. | Whether delivery is paid | Name of recipient | Recipient post code | Recipient address | Recipient phone No. | Remark |
| 1667351 | | | | | | |

| Delivery information #1 |
|---|

⊞ Box 1

| Shipment status | Delivery type | Courier | Invoice No. | Shipment date | Shipment last time | |
|---|---|---|---|---|---|---|
| Request for shipment | Truckline | Coupang | 9138960 | | 2020-09-24 01:39:59 | ~542 |
| skuId | barcode | Product name | | | Quantity | |
| 6278 | 7170086 | XXElectronics, SM-F700N | | | 1 | |

FIG. 5G

| Mobile carrier service additional info | ✕ |
|---|---|

▷ Subscriber info

| Subscriber name<br>Subscriber contact<br>Subscriber email address | |
|---|---|

▷ Device and pricing info

| | |
|---:|---:|
| Original price | 1,199,000 Won |
| Public subsidy | - Won |
| Additional subsidy | - Won |
| Actual purchase price | 1,139,000 Won |
| Coupang payment | 1,139,000 Won |
| Carrier installment principal<br>(Actual purchase price Coupang payment) | - Won |
| Pricing plan | (PLUS) |
| Pricing amount | 60,000 Won |
| Number of installment months | - Months |
| Selective contract discount | 15,000 Won |
| Monthly payment | 45,000 Won |
| Estimated monthly payment | 45,000 Won |

▷ Device detail info

| Terminal serial No. | SMN981AR0232oooo | — 572 |
| USIM serial No. | 8982 3012 3456 oooo | — 574 |

INFORMATION PROVIDING METHOD FOR PROVIDING INFORMATION REGARDING TERMINAL ACTIVATION AND ELECTRONIC DEVICE PERFORMING THE SAME

BACKGROUND

Technical Field

Various embodiments of the present disclosure relates to a method of providing information associated with activation of a terminal and an electronic apparatus performing the method.

Description of the Related Art

As the Internet has become commonly used, the e-commerce market is growing. In particular, the spread of infectious diseases has dramatically increased interest in the field of e-commerce/online purchase, where products can be purchased not in face to face. Accordingly, even regarding a portable terminal purchase, the demand for purchasing a portable terminal online in the e-commerce market is increasing.

However, online purchase of a portable terminal requires not just a delivery of the product to a delivery destination requested by a customer through a delivery service, but also subscription to a mobile carrier and an activation procedure of the terminal. However, conventionally, in order to purchase a portable terminal online and proceed with the activation of the purchased portable terminal, a purchaser had to review and fill in a complicated contract form online before the purchase and delivery of the portable terminal, and such hassle and difficulty made many potential purchasers avoid online purchase of portable terminals but instead visit a mobile carrier agency offline to activate the terminals.

As described above, there is a need for a method for effectively providing a service of selling and activating a portable terminal online and an apparatus using the method.

SUMMARY

Technical Goals

An aspect of the present disclosure provides a method and an apparatus for providing information associated with activation of a terminal to allow an effective online purchase of a portable terminal by providing a delivery service and a wired activation service of the portable terminal when the portable terminal is purchased online by a purchaser.

In addition, another aspect of the present disclosure provides a method and an apparatus for efficiently enabling the aforementioned service associated with activation of a portable terminal by providing information associated with activation to a service administrator based on order information and delivery associated information.

Technical Solutions

A method performed by an electronic apparatus to provide information associated with activation of a portable terminal according to various embodiments includes acquiring order information associated with the portable terminal, acquiring information associated with delivery of the portable terminal corresponding to the order information from a serve, and, based on the order information and the information associated with the delivery of the portable terminal, providing the information associated with the activation of the portable terminal, and the information associated with the activation comprises information on or regarding whether the portable terminal has been shipped out.

An electronic apparatus according to various embodiments includes a communication module and a processor electrically connected to the communication module, and the processor is configured to acquire order information associated with the portable terminal using the communication module, acquire information associated with delivery of the portable terminal corresponding to the order information from a server using the communication module; and provide information associated with the activation of the portable terminal based on the order information and the information associated with the delivery, and the activation associated information comprises information on whether the portable terminal has been shipped out.

Effects

According to various embodiments of the present disclosure, when a portable terminal is purchased online, a delivery service of the purchased portable terminal is preferentially performed, so that the expectation of a purchaser who wants to receive and use the purchased portable terminal as soon as possible can be satisfied.

In addition, by providing an activation service of the portable terminal over the wire while delivery is in progress, it is possible to provide a service that allows you to use the portable terminal as soon as the delivery is completed, and if the order for the portable terminal is canceled due to the change of mind of the purchaser In addition, it is possible to provide improved purchaser convenience by providing a function that enables immediate cancellation-related delivery and withdrawal of operation.

In addition, according to an embodiment of the present specification, a procedure required for terminal activation is managed so that an administrator (counselor) can easily perform a task, and information related thereto is effectively transmitted to a purchaser, thereby improving user convenience.

In addition, order information and delivery associated information are linked and processed so that the administrator (counselor) can more effectively and efficiently provide the portable terminal activation service to the purchaser.

BRIEF DESCRIPTION OF THE DRAWINGS

FIGS. 5A to 5G are diagrams schematically illustrating a screen for providing information associated with activation according to various embodiments of the present disclosure.

DETAILED DESCRIPTION

Figure 1:
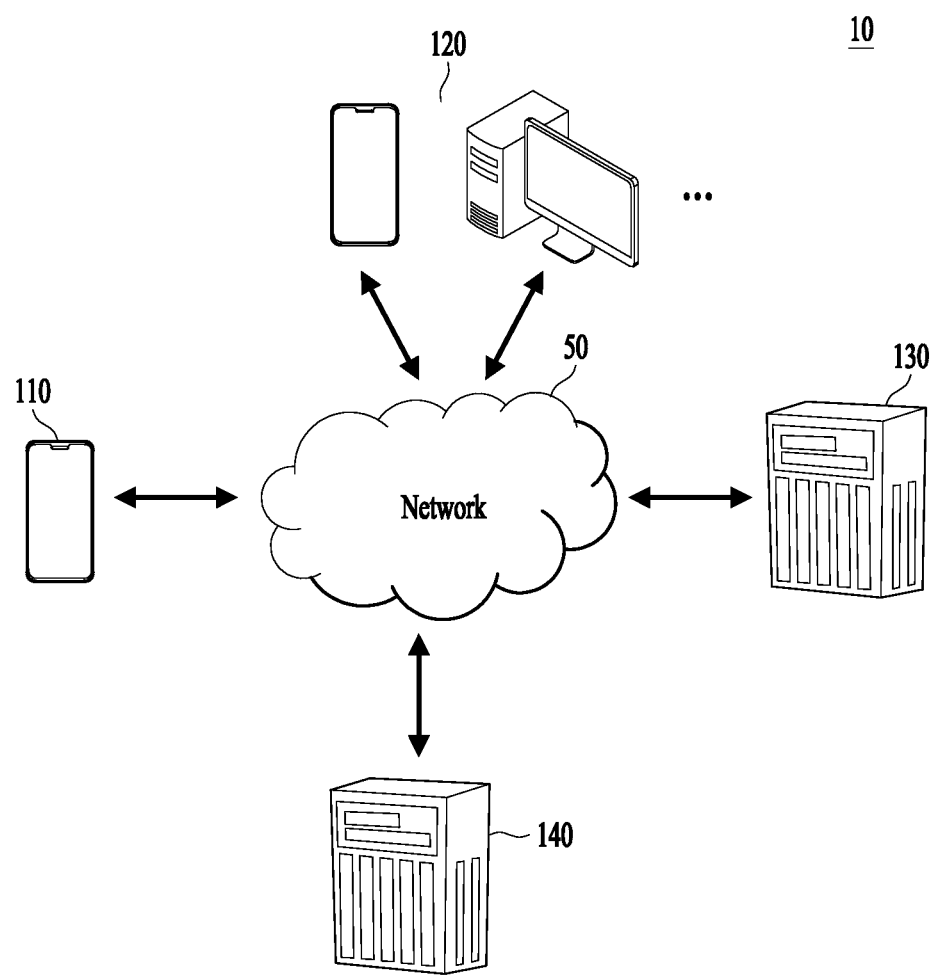
FIG. 1 is a schematic configuration diagram illustrating a system for providing information associated with activation of a portable terminal according to various embodiments of the present disclosure.

Terms used in embodiments are selected among common terms that are currently widely used in consideration of their functions in the present disclosure, but the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part is said to "include" a certain component, which means that it may further include other components, except to exclude other components unless otherwise stated. In addition, terms such as " . . . unit", " . . . module", or the like refer to units that perform at least one function or operation, and the units may be implemented as hardware or software or as a combination of hardware and software.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or mobile terminal capable of accessing a server or another terminal over a network. The computer includes, for example, a laptop equipped with a web browser, a desktop, a laptop, and the like, and the mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily carry out the present disclosure. However, the present disclosure may be embodied in many different forms and is not limited to the embodiments described herein.

Hereinafter, embodiments of the present disclosure will be described in detail with reference to the accompanying drawings.

In describing the embodiments, descriptions of technical contents that are well known in the technical field to which the present disclosure pertains and are not directly related to the present disclosure will be omitted. This is to more clearly convey the gist of the present disclosure by omitting unnecessary description.

For the same reason, some components in the accompanying drawings are exaggerated, omitted, or schematically illustrated. In addition, the size of each component does not entirely reflect the actual size. The same reference numerals are assigned to the same or corresponding components in each drawing.

Advantages and features of the present disclosure, and a method of achieving them will become apparent with reference to the embodiments described below in detail together with the accompanying drawings. However, the present disclosure is not limited to the embodiments disclosed below, but may be implemented in a variety of different forms, only the present embodiments are intended to complete the present disclosure, and the general knowledge in the technical field to which the present disclosure pertains, the present disclosure is defined by the scope of the claims, and the same reference numbers will be used to refer to the same or similar parts throughout the drawing.

In this case, it may be appreciated that respective blocks of flowcharts and combinations of the flowcharts can be executed by computer program instructions. Since the computer program instructions can be mounted on a processor of a general-use computer, a special computer, or other programmable data processing equipment, the instructions executed through the processor of the computer or other programmable data processing equipment generate means for executing functions described in the flowchart(s). Since the computer program instructions can be stored in a computer-usable or computer-readable memory that can orient the computer or other programmable data processing equipment in order to implement functions by a specific scheme, the instructions stored in the computer-usable or computer-readable memory may produce manufacturing articles including the instruction means for executing the functions described in the flowchart(s). Since the computer program instructions may be installed in the computer or other programmable data processing equipment, the instructions that perform the computer or other programmable data processing equipment by generating a process executed by the computer through execution of a series of operating steps on the computer or other programmable data processing equipment may provide steps for executing the functions described in the flowchart(s).

In addition, each block may represent a part of a module, a segment or a code that includes one or more executable instructions for executing a specified logic function(s). It is to be noted that in some alternative examples, the functions mentioned in the blocks may occur out of order. For example, two blocks illustrated in succession may be performed substantially at the same time in reality, or the blocks sometimes may be performed in reverse order according to their functions.

FIG. 1 is a schematic configuration diagram illustrating a system for providing information associated with activation of a portable terminal according to various embodiments of the present disclosure.

According to various embodiments, the information providing system may include a purchaser terminal 110, an electronic apparatus 120, at least one external server (e.g., a distribution management server 130 and a mobile carrier server 140), and a network 50 supporting transmission and reception of information therebetween.

The electronic apparatus 120 (e.g., a server) is a device capable of providing information associated with activation of a portable terminal to an administrator terminal, and may provide various types of information for guiding the activation of the portable terminal to, for example, the administrator terminal. An administrator (or a counselor) may use the administrator terminal to perform an activation support task for activating the portable terminal ordered by a purchaser.

For example, when a purchaser inputs specific order information using the purchaser terminal 110 to purchase a specific portable terminal, the corresponding order information may be transmitted to the electronic apparatus 120 over the network 50. The electronic apparatus 120 may acquire one or more order information received from the purchaser terminal 110 over the network 50. The electronic apparatus 120 may acquire information associated with delivery of the portable terminal corresponding to the order information from a specific server (e.g., the distribution management server 130), and provide information associated with activation of the portable terminal based on the information associated with the delivery of the portable terminal. In addition, the electronic apparatus 120 may transmit and receive predetermined information to and from an external server (e.g., the mobile carrier server 140) for a processing related to the activation of the portable terminal. The administrator may identify the information associated with the activation, provided by the electronic apparatus, 120 using the administrator terminal and process an activation support task corresponding thereto. Meanwhile, the above-described electronic apparatus 120 may be implemented integrally with the administrator terminal, or may be implemented in a manner in which the administrator terminal transmits and receives information to and from the electronic apparatus 120 over the network 50.

The electronic apparatus 120 may include a plurality of computer systems or computer software which are implemented on a network server, and may provide various types of information configured as a web page. For example, the electronic apparatus 120 may refer to a computer system and a computer software, each connected to a slave device (e.g., the administrator terminal) capable of communicating with another network server over a computer network such as the Intranet or the Internet to receive a request for an operation, perform the operation and provide a result of the operation. In addition, the electronic apparatus 120 may be understood as a broader concept including a series of application programs that can operate on a network server and various databases established inside the network server. For example, the electronic apparatus 120 may be implemented using a network server program that varies depending on an operation system such as DOS, Windows, Linux, UNIX or MacOS.

The network 50 may serve to connect the electronic apparatus 120 to the purchaser terminal 110 or may serve to connect the electronic apparatus 120 to an external device (e.g., the distribution management server 130 and the mobile carrier server 140). For example, the network 50 may provide a connection path so that the purchaser terminal 110 or the external device can be connected to the electronic apparatus 120 to transmit and receive packet data to and from the electronic apparatus 120.

Operations of the system 10 for providing information associated with activation of a portable terminal may be implemented by a single physical device or may be implemented in a manner in which a plurality of physical devices are organically combined. For example, some of the configurations included in the system 10 may be implemented by any one physical device, and other configurations included in the system 10 may be implemented by another physical device. For example, any one physical device may be implemented as a part of the electronic apparatus 120, and another physical device may be implemented as a part of the administrator terminal or a part of the external device (e.g., the external servers 130 and 140). In some cases, each of the configurations included in the system 10 may be distributed and arranged in different physical devices, and the distributed configurations may be organically combined to control functions and operations of the system 10. For example, some operations described as being performed by the electronic apparatus 120 in this specification may be performed by a first server, and other operations may be performed by a second server.

Figure 2:
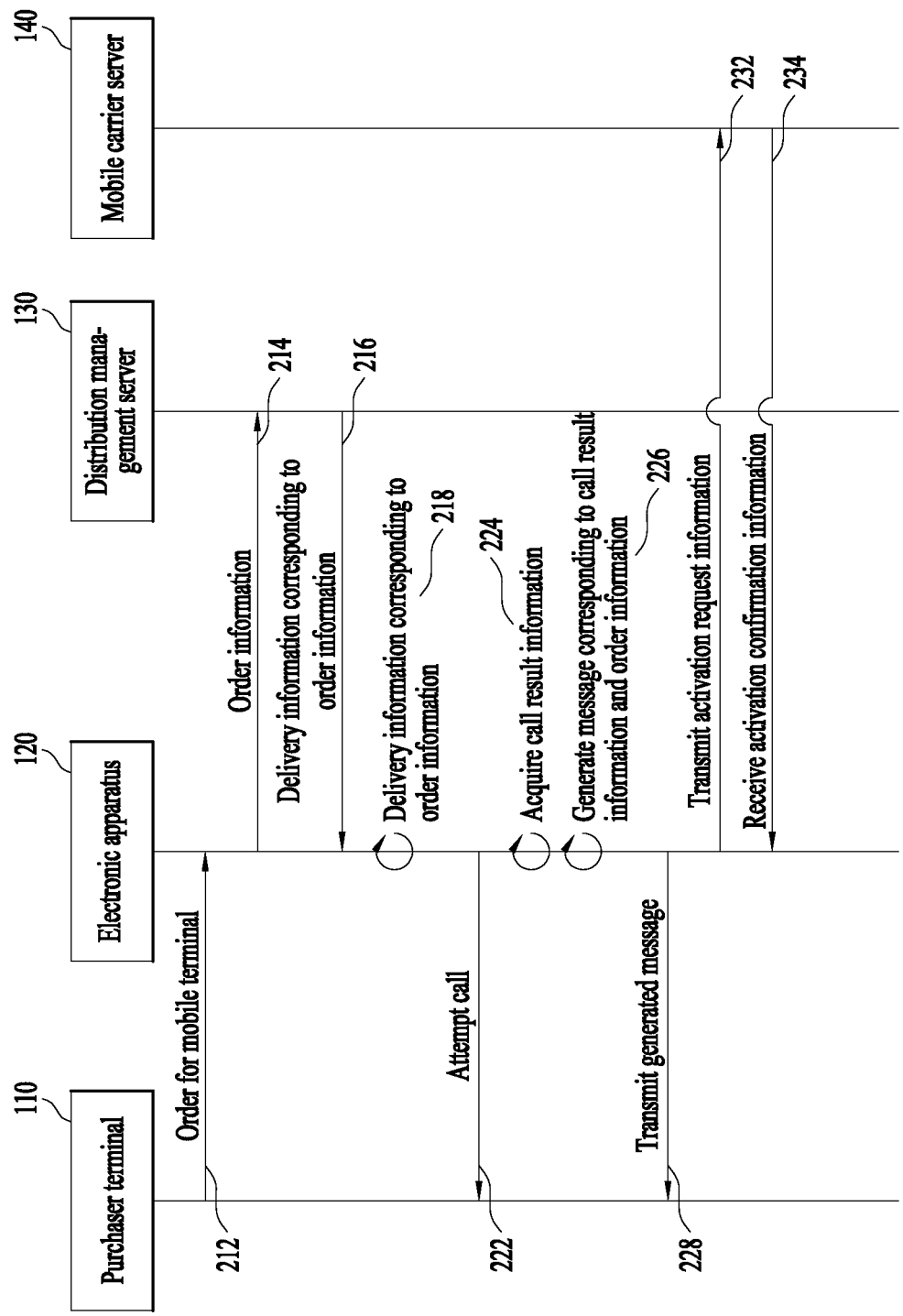
FIG. 2 is a flowchart illustrating a method of operating a system for providing information associated with activation of a portable terminal according to an embodiment of the present disclosure.

FIG. 2 is a flowchart illustrating a method of operating a system for providing information associated with activation of a portable terminal according to an embodiment of the present disclosure.

Referring to FIG. 2, according to a method for providing information associated with activation of a portable terminal according to various embodiments, a purchase order for a portable terminal may be received from a purchaser terminal 110 to an electronic apparatus 120 in operation 212.

For example, a purchaser may identify product information of a specific portable terminal, provided by the electronic apparatus 120, using the purchaser terminal 110 and purchase the portable terminal using the purchaser terminal 110. In operation 212, in response to receiving an order for the specific portable terminal from the purchaser terminal 110, the electronic apparatus 120 may acquire order information associated with the ordered portable terminal.

In operation 214, the electronic apparatus 120 may transmit order information of the portable terminal to an external server. For example, the external server may include a distribution management server 130 that performs a task associated with delivery of an ordered product. The distribution management server 130 may perform a task for delivery of an ordered portable terminal based on the acquired order information of the portable terminal, and may initiate the delivery of the portable terminal. In addition, the distribution management server 130 may transmit information associated with delivery corresponding to the order information of the portable terminal to the electronic apparatus 120 in operation 216.

In operation 216, the electronic apparatus 120 may acquire information associated with the delivery of the portable terminal corresponding to the order information from the external server (e.g., the distribution management server 130).

For example, the information associated with the delivery may include at least a part of: current delivery status information of the portable terminal in delivery; and estimated delivery time information (e.g., a delivery shipping time and a delivery complete time).

In addition, the information associated with the delivery may include at least one of: unique identification information (e.g., International Mobile Equipment Identity (IMEI)) of the portable terminal in delivery; and subscriber identification information (e.g., Integrated Mobile Subscriber Identity (IMSI)) of a mobile carrier to activate the portable terminal. The unique identification information of the portable terminal and/or subscriber identification information of the mobile carrier may be provided based on a current delivery status of the portable terminal. For example, the electronic apparatus 120 may identify the unique identification information of the portable terminal or the subscriber identification information of the mobile carrier only when the portable terminal has been shipped out.

Meanwhile, the electronic apparatus 120 may provide information associated with activation of the portable terminal based on order information associated with the portable terminal and information associated with delivery of the portable terminal corresponding to the order information.

According to an embodiment, when the order information associated with the portable terminal is received, the electronic apparatus 120 may generate task item information associated with the activation of the portable terminal in response to the order information. An administrator may identify the task item information and perform a task associated with the activation of the portable terminal. In this regard, the electronic apparatus 120 may transmit the information to the side of the administrator terminal so that the administrator can identify a task item using the administrator terminal. In another example, the electronic apparatus 120 and the administrator terminal may be integrally formed and may provide the task item information using a separate output device, such as a display, provided in the electronic apparatus 120.

For example, in operation 218, based on the order information associated with the portable terminal and the information associated with the delivery corresponding to the order information, the electronic apparatus 120 may provide call schedule information associated with the activation of the portable terminal as the task item information.

For example, based on the order information and the information associated with the delivery, the electronic apparatus 120 may provide first call schedule information that guides an administrator to attempt an activation related call with the purchaser terminal 110 within a set time.

For example, before providing the first call schedule information, the electronic apparatus 120 may determine whether an order cancellation request has been received from the purchaser terminal 110. When it is determined, based on a result of the determination, that an order cancellation request for the ordered portable terminal has not been received, the electronic apparatus 120 may provide the first call schedule information.

In another example, based on call result information corresponding to the first call schedule information, the electronic apparatus 120 may provide second call schedule information associated with a call reattempt. For example, in response to a failure of the first call with the purchaser terminal 110 (e.g., when the first call was not answered), the electronic apparatus 120 may provide the second call schedule information that guides the administrator to reattempt an activation related call with the purchaser terminal 110 when a set time elapses after the attempt of the first call.

In operation 222, the administrator may attempt a call with the purchaser terminal 110 using the administrator terminal based on the call schedule information provided by the electronic apparatus 120. In various embodiments, the administrator may attempt a call with the purchaser terminal 110 using a specific device capable of making a call connection with the purchaser terminal 110, in addition to the above-described administrator terminal.

In operation 224, the electronic apparatus 120 may acquire call result information associated with the activation of the portable terminal. Here, the call result information may include information on whether a call with the purchaser terminal 110 was attempted based on call schedule information (e.g., the first call schedule information or the second call schedule information) provided by the electronic apparatus 120, and information on whether the call has been successfully made. For example, the call result information in operation 224 may include at least one of: information on whether a first call was attempted; information on whether the first call has been successfully made; information on whether a second call has been attempted; and information on whether the second call has been successfully made. According to an example, the electronic apparatus 120 may automatically acquire the call result information from the administrator terminal which has attempted a call with the purchaser terminal 110 or from a device corresponding to the administrator terminal. According to another example, the electronic apparatus 120 may acquire the call result information through input information (e.g., user input information) by an administrator.

In operation 226, the electronic apparatus 120 may generate and provide a message to be transmitted in association with the activation of the portable terminal, based on at least a part of the call result information and the order information acquired in operation 224. According to the message generated by the electronic apparatus 120, the administrator may transmit a message to the purchaser terminal 110 using the electronic apparatus 120 or the administrator terminal in operation 228.

In other words, the electronic apparatus 120 according to various embodiments of the present disclosure may provide call schedule information for attempting a call based on order information and information associated with delivery of a portable terminal, and may generate a message to be transmitted in association with activation of the portable terminal based on call result information corresponding to the call schedule information and the order information. Here, the electronic apparatus 120 may generate a different message according to a progress status associated with the activation based on the call result information.

Meanwhile, although FIG. 2 shows that operation 226 of generating a message is performed after operation 218 of providing call schedule information associated with activation, this is merely for convenience of explanation and various embodiments of the present disclosure are not limited to the order described above. For example, the electronic apparatus 120 may provide the first call schedule information, generate and transmit a message of a first type based on the first call result information, provide the second call schedule information, and then generate and transmit a message of a second type based on the second call result information.

Meanwhile, the electronic apparatus 120 may transmit information associated with an activation request to the mobile carrier server 140 in operation 232.

For example, the information associated with the activation request may include at least a part of: order information (e.g., mobile carrier type information set when an order is placed, and mobile carrier subscription type information), information associated with delivery (e.g., unique identification information of a portable terminal in delivery, and subscriber identification information of a mobile carrier), and call result information associated with activation (e.g., voice record information of an activation related call).

In addition, in operation 234, the mobile carrier server 140 may determine, based on the received the information associated with the activation request, whether to activation of the portable terminal is possible and may transmit activation confirmation information for the portable terminal when it is determined that the activation of the portable terminal is possible.

Meanwhile, in various embodiments of the present disclosure, various operations associated with an order for a portable terminal, a call attempt, and transmission of a generated message may be performed between the purchaser terminal 110 and the electronic apparatus 120, but this may not be information exchange between single terminals or electronic apparatuses. For example, the order information may be input from any one of terminals related to a purchaser and transmitted to the electronic apparatus 120, and a call attempt may be made between a terminal owned by the purchaser and a specific terminal of an administrator who uses the electronic apparatus 120, and relevant information may be input to the electronic apparatus 120 by the administrator. In addition, the operation of transmitting a generated message may also be implemented in a manner in which a message generated by the electronic apparatus 120 is transmitted to a terminal owned by the purchaser based on an input by the administrator or triggering according to a specific condition. As such, the electronic apparatus 120 may comprehensively manage information associated with an order for a portable terminal, and communicating with the purchaser terminal 110 may include communicating with at least one of a plurality of terminals related to the purchaser.

Figure 3:
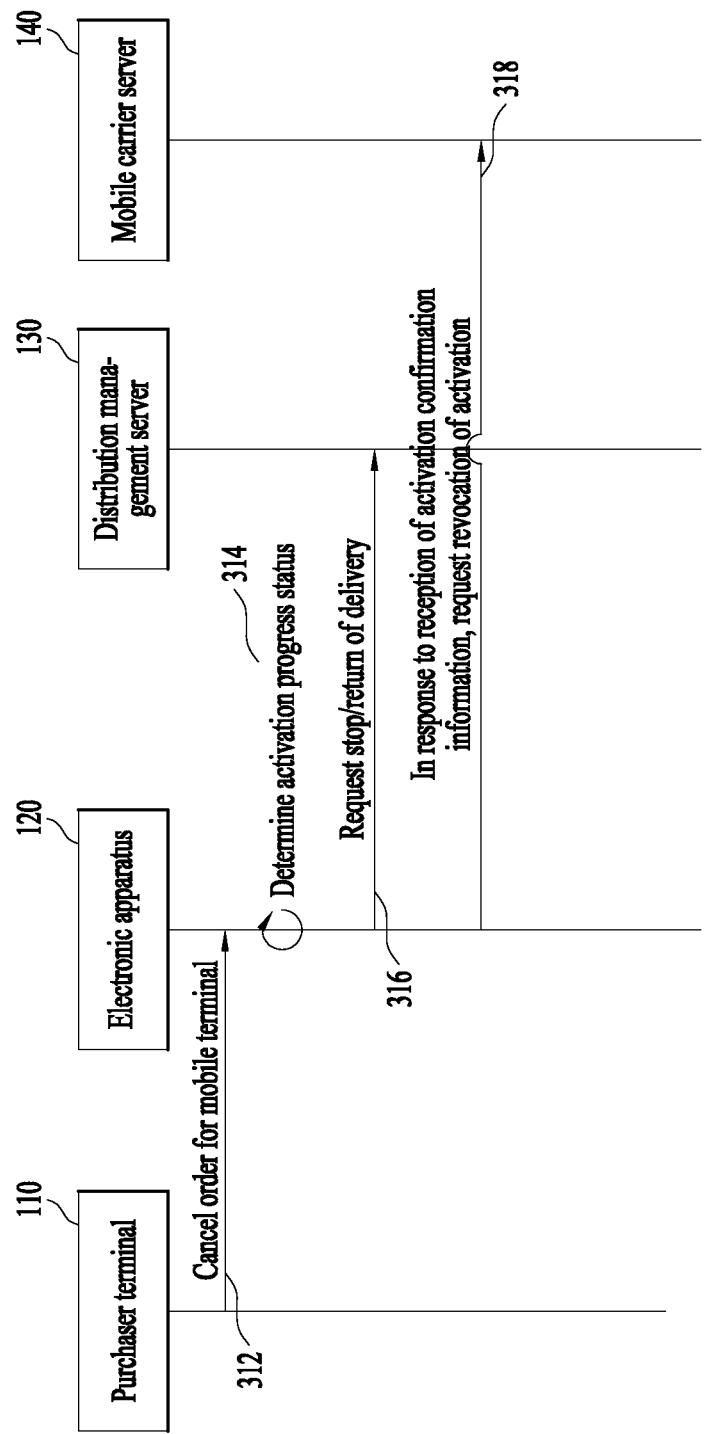
FIG. 3 is a flowchart illustrating a method of operating a system for providing information associated with activation of a portable terminal according to an embodiment of the present disclosure.

FIG. 3 is a flowchart illustrating a method of operating a system for providing information associated with activation of a portable terminal according to an embodiment of the present disclosure. Hereinafter, an operation related to order cancellation for a portable terminal will be described with reference to FIG. 3.

Referring to FIG. 3, when information on an order cancellation request for a portable terminal is received from a purchaser terminal 110 within a set period, an electronic apparatus 120 according to various embodiments may cancel an order for the portable terminal based on the corresponding order cancellation request. For example, when the information on the order cancellation request is received within the set period (e.g., 14 days after completion of an order), the electronic apparatus 120 may perform a series operations to cancel the order regardless of whether the portable terminal has been activated or whether the portable terminal has been found defective.

For example, in operation 312, the purchaser terminal 110 may transmit the information on the order cancellation request for cancelling the order for the portable terminal to the electronic apparatus 120.

In operation 314, the electronic apparatus 120 may determine a progress status of activation of the pre-ordered portable terminal based on the information on the order cancellation request received from the purchaser terminal 110.

In addition, in operation 316, the electronic apparatus 120 may transmit, to the distribution management server 130, information on a delivery stop request or information on a delivery return request for the portable terminal for which the order cancellation has been requested.

For example, based on information associated with delivery, which is confirmed by the distribution management server 130, the electronic apparatus 120 may determine whether the portable terminal is in preparation for delivery in a fulfillment center, whether the portable terminal has been shipped out from the fulfillment center and now in the process of delivery, or whether the portable terminal has been delivered. In operation 316, when it is determined, based on the information on a current delivery status, that the portable terminal has not yet to be shipped out, the electronic apparatus 120 may transmit simply information on a delivery stop request to the distribution management server 130, and when it is determined that the portable terminal has been shipped out or has been delivered, information on a return request for the portable terminal may be transmitted.

Next, in operation 318, the electronic apparatus 120 may perform different activation cancellation procedures depending on whether activation confirmation information has been received from the mobile carrier server 140 (see operation 234 in FIG. 2).

For example, when the electronic apparatus 120 receives information on activation confirmation from the mobile carrier server 140 before receiving the information on the order cancellation request in operation 312, the electronic apparatus 120 may transmit information on a request for revocation of activation of the portable terminal to the mobile carrier server 140. In addition, although not shown, the electronic apparatus 120 may receive confirmation information associated with the revocation of the activation from the mobile carrier server 140 and transmit the confirmation information to the purchaser terminal 110 associated with the portable terminal.

For example, when the activation confirmation information has not been received, for example, when an activation procedure for the portable terminal has not yet started or is in progress, the electronic apparatus 120 may, regarding activation-associated task item information generated as a part of information associated with activation of the portable terminal, process a corresponding task to be complete and stop a series of operations associated with the activation.

According to various embodiments of the present disclosure, a purchaser is allowed to easily place an order for a portable terminal not in face to face, the portable terminal may be quickly delivered to the purchaser as soon as the placement of the order, and the portable terminal may be activated simply through a simple calling procedure or a message entering procedure even without a separate complicated paperwork procedure, and accordingly, an optimal service for purchase and activation of the portable terminal may be provided. In addition, there may be provided a function that allows a purchaser to easily cancel the order for the portable terminal without hassle within a predetermined period.

Figure 4:
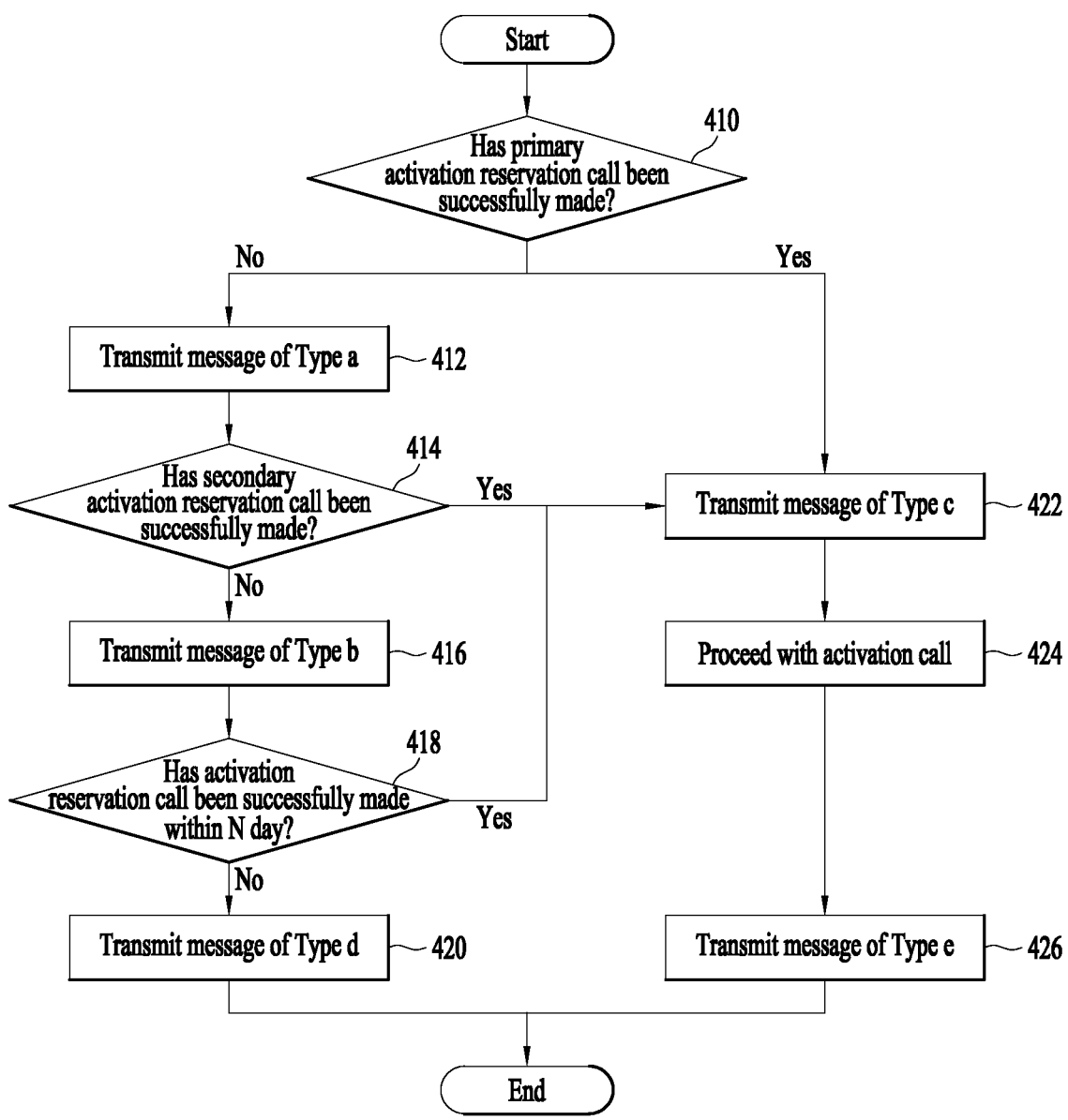
FIG. 4 is a schematic flowchart illustrating an operation of sending a message according to various embodiments of the present disclosure.

FIG. 4 is a schematic flowchart illustrating an operation of sending a message according to various embodiments of the present disclosure.

An electronic apparatus 120 according to various embodiments may generate and provide different messages depending on a situation corresponding to call result information, as described above with reference to operation 218 to 228 in FIG. 2.

Referring to FIG. 4, in operation 410, the electronic apparatus 120 may determine whether a first call has been attempted and whether the first call has been successfully made.

For example, the attempt of the first call may correspond to a primary activation reservation call attempt associated with activation of the portable terminal between an administrator terminal and a purchaser terminal 110.

The electronic apparatus 120 may transmit predetermined information to a distribution management server 130 in response to acquisition of order information associated with the portable terminal so that delivery of the portable terminal can be initiated, and the electronic apparatus 120 may provide activation associated information (e.g., first call schedule information) in response to the acquisition of the order information so that an administrator can be guided to attempt the first call (e.g., the primary activation reservation call).

For example, the administrator may guide the purchaser through the first call to proceed with an activation call in operation 424.

Meanwhile, according to an embodiment, the administrator terminal may include a first administrator terminal for exchanging information with the electronic apparatus 120 and a second administrator terminal for performing a call with the purchaser. For example, the first administrator terminal and the second administrator terminal may be implemented in association with each other, but not limited thereto, and the electronic apparatus 120 may acquire call associated information in a manner in which the administrator inputs the call associated information to the first administrator terminal.

In operation 412, when it is determined that the first call (e.g., the primary activation reservation call) has failed based on a result of the first call attempt of operation 410, that is, when the first call was not answered, the electronic apparatus 120 may generate a message of Type a and send the message of Type a to the purchaser terminal 110. For example, the message of Type a may include information indicating that a second call of operation 414 is scheduled to be attempted to the purchaser terminal 110 at a set time.

In operation 422, when it is determined, based on a result of the first call attempt of operation 410, that the first call (e.g., the primary activation reservation call) has been successfully made, the electronic apparatus 120 may generate a message of Type c and send the message of Type c to the purchaser terminal. For example, the message of Type c may include information guiding that the activation call of operation 424 is scheduled at a set time.

The message of Type a and the message of Type c may be generated based on the order information associated with the portable terminal to correspond to mobile carrier type information and mobile carrier subscription type information (e.g., change of device, number transfer, new subscription, etc.) included in the order information. In addition, the message of Type a and the message of Type c may include terms and conditions for activation.

In operation 414, the electronic apparatus 120 may determine whether a second call has been attempted or whether the second call has been successfully made. The electronic apparatus 120 may provide activation associated information (e.g., secondary call schedule information) so that the second call (e.g., a secondary activation call) can be attempted by the administrator.

When it is determined, based on the information determined in operation 414 as to whether the second call has been successfully made, that the second call (e.g., a secondary activation reservation call) has also failed, that is, when the second call was not answered, the electronic apparatus 120 may generate a message of Type b and send the message of Type b to the purchaser terminal 100 in operation 416. For example, the message of Type b may include information guiding the purchaser to attempt an activation call within a predetermined period, and may include terms and conditions information for activation. The message of Type b may also be generated in response to the mobile carrier type and mobile carrier subscription type information included in the order information.

Meanwhile, when it is determined in operation 414 that the second call has been successfully made, the electronic apparatus 120 may perform operation 422 described above.

In operation 418, the electronic apparatus 120 may verify information on whether an activation reservation call or an activation call has been successfully made with the purchaser within a predetermined period (e.g., 14 days since placement of an order).

When it is determined that the activation reservation call or the activation call has failed within the predetermined period, the electronic apparatus 120 may go to operation 420 to generate a message of Type d and send the message of Type d to the administrator terminal 110. For example, the message of Type d may include information that guides order cancellation confirmation associated with the portable terminal, and may further include information that requests a return of the portable terminal, which has been delivered, according to the order cancellation confirmation.

Meanwhile, when it is determined that the activation reservation call or the activation call has been successfully made within the predetermined period, the electronic apparatus 120 may perform an activation procedure in operation 422 (or operation 424) described above.

In operation 424, as the activation call to the purchaser proceeds, the electronic apparatus 120 may acquire voice record information of the activation call, match the voice record information with the order information of the purchaser, and store the matched voice record information of the activation call in a database. In addition, the electronic apparatus 120 may transmit the voice record information of the activation call to an external server (e.g., the mobile carrier server 140).

In operation 425, when it is determined that the activation call to the purchaser has been successfully complete, the electronic apparatus 120 may generate a message of Type e and send the message of Type e to the purchaser terminal 110. For example, the message of Type e may include information guiding that the activation of the portable terminal has been successfully complete.

FIGS. 5A to 5G are diagrams schematically illustrating a screen for providing information associated with activation according to various embodiments of the present disclosure. For example, FIGS. 5A to 5G may correspond to a user interface screen for an administrator, the screen which provides information associated with activation that is generated based on order information when order information associated with a portable terminal is received in an electronic apparatus 120.

Referring to FIG. 5A, as order information associated with a portable terminal is received, the electronic apparatus 120 may generate and provide activation associated task item information for the portable terminal. For example, the electronic apparatus 100 may provide a plurality of activation associated task items 512 corresponding to a plurality of order information for orders placed by a plurality of purchasers. An administrator may check the activation associated task item information provided by the electronic apparatus 120 using an administrator terminal.

Meanwhile, the electronic apparatus 120 may determine, based on a preset criterion, a task item required to be preferentially processed by the administrator from among the plurality of activation associated task items corresponding to a plurality of orders, and may display information on the task item required to be preferentially processed in response to receiving input information associated with a specific item (e.g., Play button 514).

Referring to FIG. 5B, the electronic apparatus 120 may provide information so that order information 522 and purchaser information 526 of the corresponding portable terminal can be identified on a screen of task item information corresponding to a specific order information. In addition, the electronic apparatus 120 may further provide, on the screen, an item 524 through which the administrator can enter input information associated with a history of activation guide to a purchaser.

For example, order information 22 of a portable terminal may include at least a part of: order complete date information, product identification information (e.g., product name, product ID), information on a type of the portable terminal ordered (e.g., model name of the portable terminal), information associated with a seller, a mobile carrier type information, a mobile carrier subscription type information (e.g., change of device, number transfer, new subscription, etc.), information associated with subscriber identification information (e.g., whether a new SIM card has been purchased), and subscribed pricing plan information.

Figure 5C:
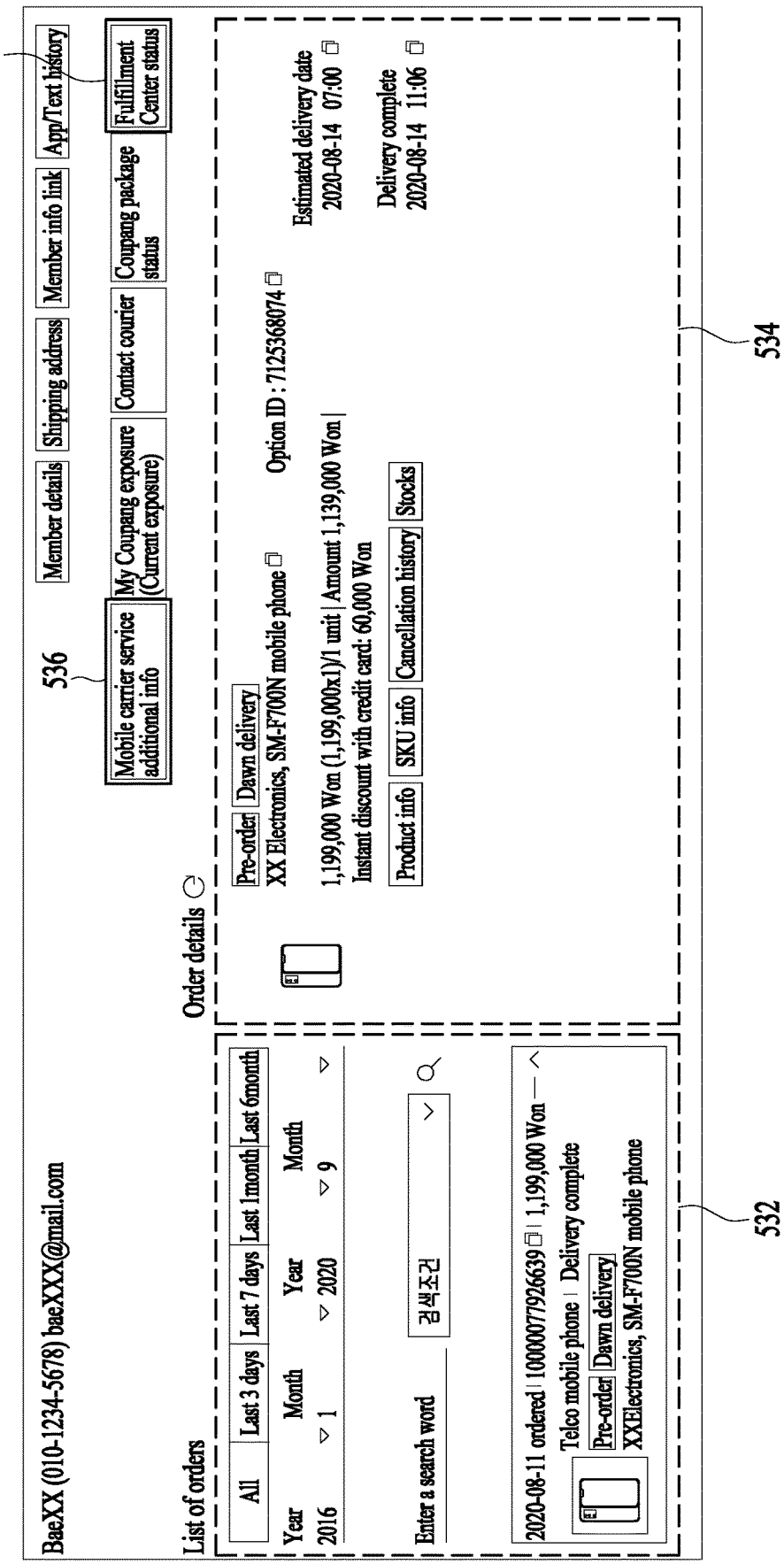

For example, purchaser information 526 may include information 532 regarding a list of orders previously placed by the purchaser, detailed information 534 on specific order information, purchaser contact information, etc., as shown in a detailed screen of FIG. 5C. In addition, the detailed screen associated with the purchaser information 526 of FIG. 5C may further include: an "Mobile carrier service additional info" item 536 (see FIG. 5G) where unique identification information of the portable terminal (e.g., a terminal serial number 572) and subscriber identification information of a mobile carrier (e.g., a USIM serial number 574) can be identified; and a "Fulfilment center status" item 538 (see FIG. 5D) where information on whether the portable terminal in delivery has been shipped out, a shipment complete time (or an estimated shipment complete time (e.g., "shipment last time" 542)), a delivery complete time (or an estimated delivery complete time), current delivery status, delivery type information, courier information, etc., can be identified.

For example, the administrator may check the display screen of FIG. 5A in which the task items 512 associated with activation of the electronic apparatus 120 are listed, and, when the "Play" button 514 is pressed in order to determine an item to be preferentially processed, the electronic apparatus 120 may provide task item information corresponding to specific order information (e.g., order information associated with the item to be preferentially processed) according to the entered information, as shown in the display screen of FIG. 5B. The administrator may check the order information 522 of the portable terminal on the display screen of FIG. 5B, and may determine, through "Open reply", "Internal memo", etc., shown in the display screen of FIG. 5B, that an activation guide for the purchaser has not proceeded with. In addition, the administrator may check detailed purchaser information as shown in FIG. 5C by pressing an "Inquiry for customer info" button 526 of FIG. 5B.

For example, the administrator may check predetermined information for an activation associated call (e.g., an activation reservation call) by checking the "Additional info of mobile carrier service" item 536 (see FIG. 5G) and the "Fulfillment center status" item 538 (see FIG. 5D).

Meanwhile, even without the administrator's entering into the "Fulfillment center status" item 538 to check information regarding whether shipment has been complete or information on a shipment complete time (or an estimated shipment complete time), as shown in FIG. 5D, the electronic apparatus 120 may display information on an activation associated call available time on a task item information screen that is provided as shown in FIG. 5B in association with the information associated with shipment or the information on the shipment complete time. In addition, when it is determined that the administrator is now on an activation call with the purchaser, the electronic apparatus 120 may automatically output detailed device information 572 and 574 shown in FIG. 5F, and may automatically acquire voice record information of the activation call. In particular, when it is determined, in association with delivery status information of the portable terminal, that the portable terminal has been shipped out, the electronic apparatus 120 may output the detailed device information 572 and 574.

Figure 5E:
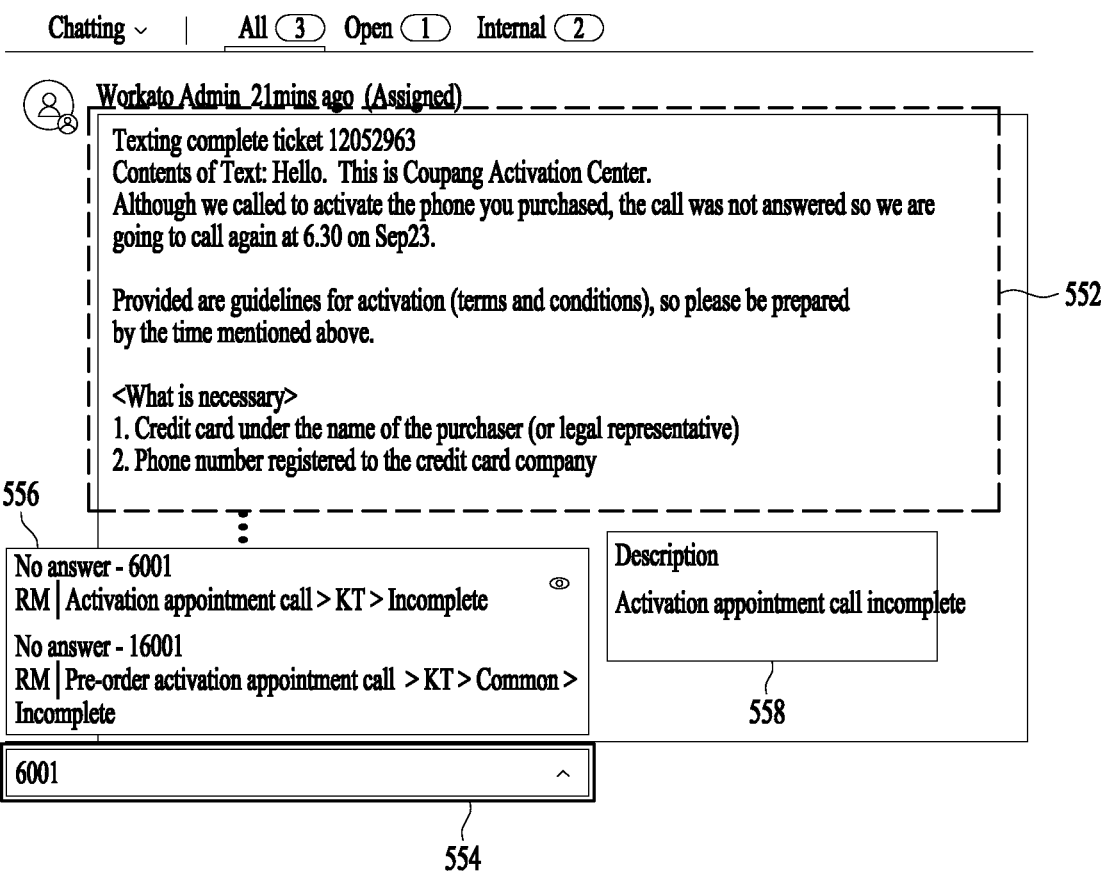

Meanwhile, FIG. 5E illustrates an example screen in which the electronic apparatus 120 generates a message of a specific type based on information on a result of a call with a purchaser. For example, in the case of a failure of a first call with the purchaser (that is, no answer to the first call), the administrator may input corresponding call result information 554 (e.g., index information corresponding to a call result, for example, reference numeral "6001" in FIG. 5E) into the electronic apparatus 120. For example, in response to the input 554 of result information of the first call, the electronic apparatus 120 may generate and provide a message 552, which corresponds to order information and the call result information. For example, the electronic apparatus 120 may provide an index information list 556 corresponding to items associated with the call result, and may optionally provide detailed information 558 of any one item selected from the list.

Figure 5F:
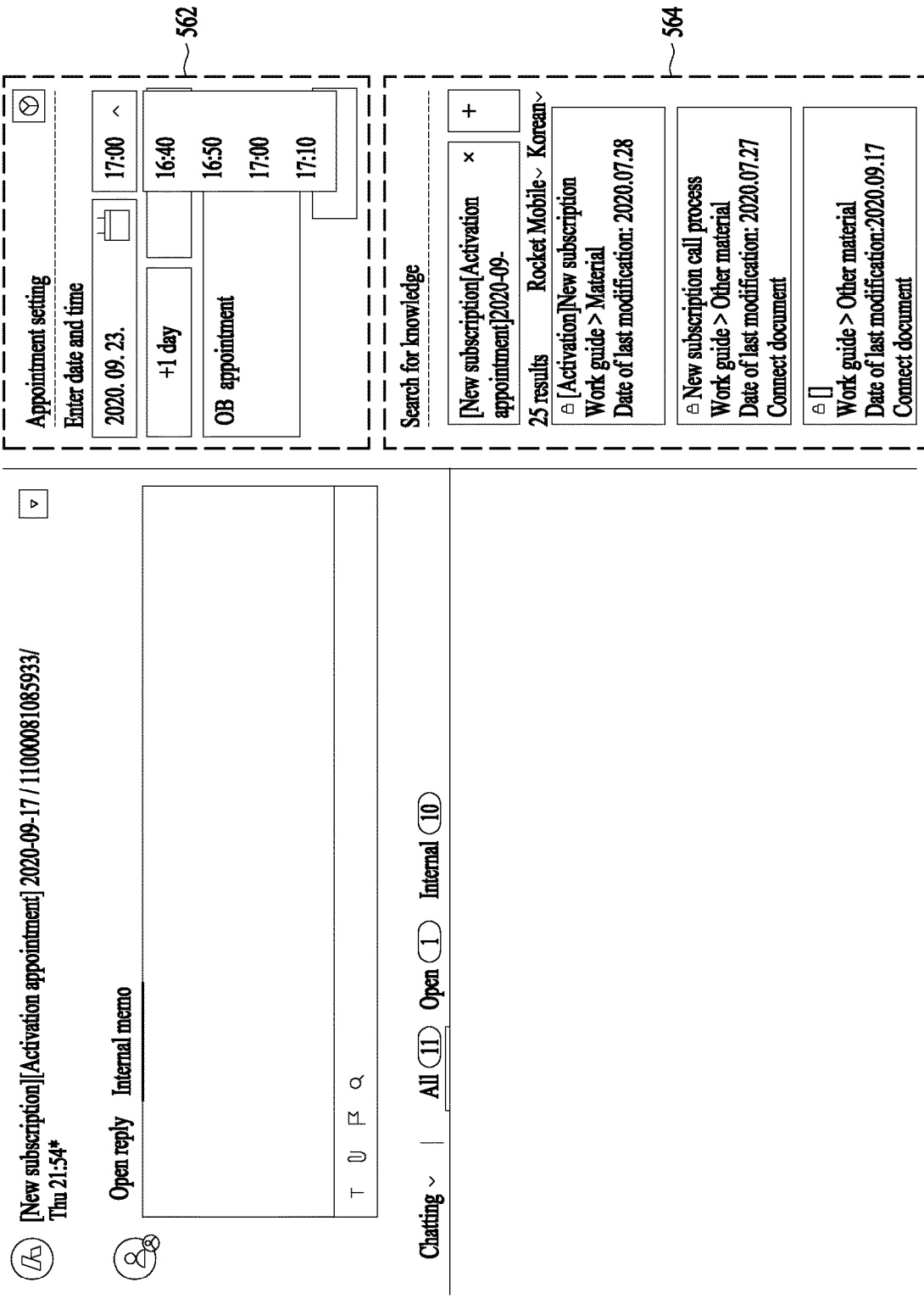

In addition, in FIG. 5F, the electronic apparatus 120 may generate and provide schedule information 562 associated with a call reattempt based on the input of the call result information. For example, when it is determined, based on the call result information, that the first call has failed, the electronic apparatus 120 may provide schedule information that guides the administrator to attempt a second call after a set time elapses. For example, the administrator may modify and input time information of when to provide schedule information or comment information regarding the schedule information on the schedule information generation screen, and the electronic apparatus 120 provides information to the administrator according to the modified schedule information.

Meanwhile, as shown in FIG. 5F, when the administrator performs a specific activation associated procedure, the electronic apparatus 120 may further provide a function of outputting manual information 564 associated with the procedure.

Figure 6:
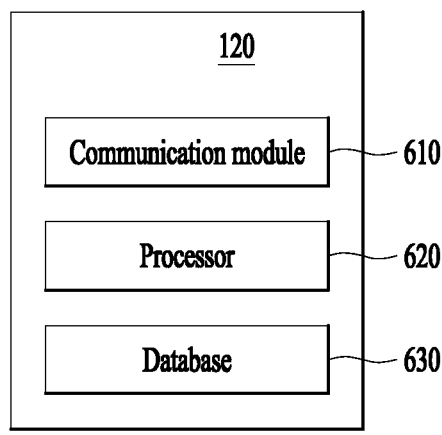
FIG. 6 is a schematic block diagram of an electronic apparatus according to an embodiment of the present disclosure.

FIG. 6 is a schematic block diagram of an electronic apparatus according to an embodiment of the present disclosure.

Referring to FIG. 6, an electronic apparatus 120 (e.g., a server) according to various embodiments may include at least one of a communication module 610, a processor 620, and a database 630.

The processor 620 may process a series of operations for performing a method of providing information associated with activation according to various embodiments of the present disclosure. In addition, the processor 620 may generally control other components of the electronic apparatus 120.

For example, the processor 620 may acquire order information associated with a portable terminal, acquire information associated with delivery corresponding to the order information from an external server, and store the corresponding information in the database 630. Also, the processor 620 may provide various activation associated information based on the order information and the information associated with the delivery.

In addition, the processor 620 may execute various functions according to various embodiments of the present disclosure described with reference to FIGS. 2 to 4, and the like.

The database 630 is a data structure implemented in a predetermined storage space of the electronic apparatus 120 and may freely perform functions such as storing, searching, deleting, editing, or adding data. For example, the database 630 may have fields or elements for processing functions such as storing, searching, deleting, editing, or adding data.

The database 630 may store data related to various functions of the electronic apparatus 120. For example, the database 630 may store a variety of information necessary to provide information associated with activation and may store instructions or data to execute operations of the processor 620. For example, the database 630 may store various types of order information or information associated with delivery which is received from an outside through the communication module 610, and when an activation call has been successfully performed, voice record information of the activation call may be stored to correspond to the order information.

The communication module 610 may transmit information stored in the database 630 of the electronic apparatus 120 or predetermined information processed by the processor 620 to another device, or may transmit predetermined information from another device to the electronic apparatus 120. For example, the communication module 610 may receive predetermined user input information from an administrator terminal. In an embodiment, the communication module 610 may include a transceiver for transmitting and receiving information.

In addition, the electronic apparatus 120 according to the embodiment may further include an interface capable of receiving information from an administrator and providing information to the administrator.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the invention.

The electronic device or the terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

This embodiment may be represented by functional block configurations and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method performed by an electronic apparatus to provide information associated with activation of a portable terminal, the method comprising:
   acquiring order information associated with the portable terminal;
   acquiring information associated with delivery of the portable terminal corresponding to the order information from a server;
   based on the order information and the information associated with the delivery of the portable terminal, providing the information associated with the activation of the portable terminal, wherein the information associated with the activation comprises information regarding whether the portable terminal has been shipped out;
   transmitting activation request information for the portable terminal to an external device based on call result information;
   receiving activation confirmation information for the portable terminal from the external device; and
   transmitting a guide message to a terminal of a user of the portable terminal based on the received activation confirmation information.

2. The method of claim 1,
   wherein the information associated with the delivery comprises at least one of: unique identification information of the portable terminal in delivery, and subscriber identification information of a mobile carrier to activate the portable terminal.

3. The method of claim 1,
   wherein the information associated with the activation comprises call schedule information associated with the activation of the portable terminal.

4. The method of claim 1,
   wherein the providing of the information associated with the activation comprises:
   acquiring the call result information associated with the activation of the portable terminal; and
   based on at least a part of the call result information and the order information, generating a message to be transmitted in association with the activation.

5. The method of claim 4,
   wherein the call result information comprises at least one of: information regarding whether a first call has been attempted, information regarding whether the first call has been made successfully, information regarding whether a second call has been attempted, and information regarding whether the second call has been made successfully.

6. The method of claim 4,
   wherein the providing of the information associated with the activation comprises generating schedule information associated with a call reattempt based on the call result information.

7. The method of claim 5,
   wherein the generating of the message comprises:
   generating a message of a first type when the first call fails;

generating a message of a second type when the second call fails; and generating a message of a third type when the first call or the second call has been made successfully.

8. The method of claim 1, wherein the order information comprises at least one of: information regarding a type of a mobile carrier to activate the portable terminal and information regarding a type of a mobile carrier subscription of the portable terminal.

9. The method of claim 1, wherein the information associated with the activation comprises at least one of a delivery shipping time of the portable terminal and a delivery complete type of the portable terminal.

10. The method of claim 4, wherein the generating of the message comprises, when it is determined that a call associated with the activation of the portable terminal has failed within a set time, generating a message related to canceling an order for the portable terminal.

11. The method of claim 10, further comprising:

when order cancellation request information associated with the portable terminal is acquired, determining whether to cancel an order for the portable terminal based on whether the activation confirmation information has been received.

12. An electronic apparatus, comprising:

a transceiver; and a processor electrically connected to the transceiver, wherein the processor is configured to:

acquire order information associated with the portable terminal using the transceiver;

acquire information associated with delivery of the portable terminal corresponding to the order information from a server using the transceiver;

provide information associated with the activation of the portable terminal based on the order information and the information associated with the delivery, wherein the activation associated information comprises information regarding whether the portable terminal has been shipped out;

transmit activation request information for the portable terminal to an external device based on call result information;

receive activation confirmation information for the portable terminal from the external device; and transmit a guide message to a terminal of a user of the portable terminal based on the received activation confirmation information.

13. The electronic apparatus of claim 12, wherein the information associated with the delivery comprises at least one of: unique identification information of the portable terminal in delivery and subscriber identification information of a mobile carrier to activate the portable terminal.

14. The electronic apparatus of claim 12, wherein the processor is configured to:

acquire the call result information associated with the activation of the portable terminal; and based on at least a part of the call result information and the order information, generate a message to be transmitted in association with the activation.

\* \* \* \* \*